(12) United States Patent
Kuzminskiy et al.

(10) Patent No.: US 6,895,039 B2
(45) Date of Patent: May 17, 2005

(54) METHOD AND APPARATUS FOR COLLISION RESOLUTION IN A DELAY-CRITICAL RADIO TELECOMMUNICATIONS SYSTEM

(75) Inventors: Alexandr Kuzminskiy, Swindon (GB); Carlo Luschi, Oxford (GB); Konstantinos Samaras, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 796 days.

(21) Appl. No.: 09/782,423

(22) Filed: Feb. 13, 2001

(65) Prior Publication Data

US 2002/0034258 A1 Mar. 21, 2002

(30) Foreign Application Priority Data

Feb. 16, 2000  (EP) ............................................. 00301204

(51) Int. Cl.[7] .......................... H04B 15/00; H04K 1/00; H04L 27/30
(52) U.S. Cl. ....................... 375/150; 375/152; 375/142; 375/143; 370/335; 370/342; 370/441; 370/479
(58) Field of Search ................................ 375/142, 143, 375/144, 148, 150, 152; 370/335, 342, 441, 462, 479

(56) References Cited

U.S. PATENT DOCUMENTS

| | | | | |
|---|---|---|---|---|
| 5,721,733 A | | 2/1998 | Wang et al. ................. | 370/332 |
| 5,850,392 A | * | 12/1998 | Wang et al. ................. | 370/335 |
| 6,163,533 A | * | 12/2000 | Esmailzadeh et al. ...... | 370/342 |
| 6,259,724 B1 | * | 7/2001 | Esmailzadeh ............... | 375/143 |
| 6,466,565 B1 | * | 10/2002 | Wax et al. ................... | 370/342 |
| 6,542,493 B1 | * | 4/2003 | Moerder ...................... | 370/342 |
| 6,625,138 B2 | * | 9/2003 | Kärnä et al. ................. | 370/342 |
| 6,674,765 B1 | * | 1/2004 | Chuah et al. ................ | 370/458 |

FOREIGN PATENT DOCUMENTS

WO      98/18280       4/1998     ............ H04Q/7/38

OTHER PUBLICATIONS

Blind Algorithms For Joint Clock Recovery And Baseband Combining In Digital Radio, F. Guglielmi, C. Luschi, A. Spalvieri, dated Nov. 10, 1993.

* cited by examiner

Primary Examiner—Phuong Phu

(57) ABSTRACT

In a PRACH channel, colliding signals are resolved by use of a number of training-like symbols in the colliding data payloads. The signals are estimated by spatio temporal filters running a training-based or semi-blind algorithm, and a selection criterion is applied to the estimated signals, such as distance from the finite alphabet or the mean square error.

9 Claims, 7 Drawing Sheets

| TLS1 | seq.k | +1 | +1 |
| TLS2 | seq.k | +1 | -1 |
| TLS3 | seq.k | -1 | +1 |
| TLS4 | seq.k | -1 | -1 |

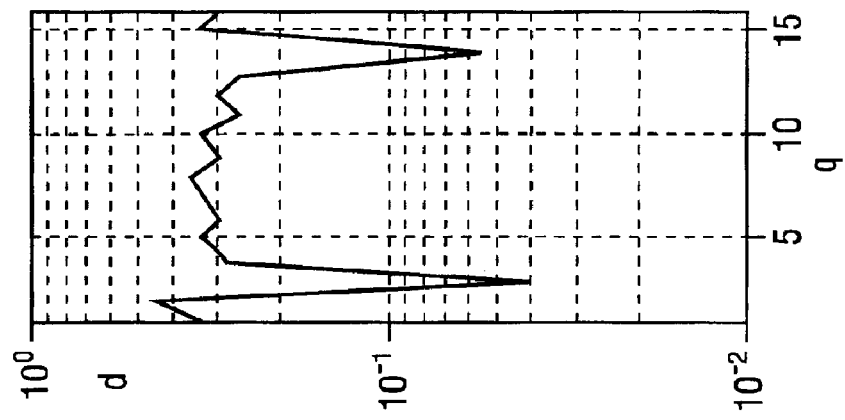
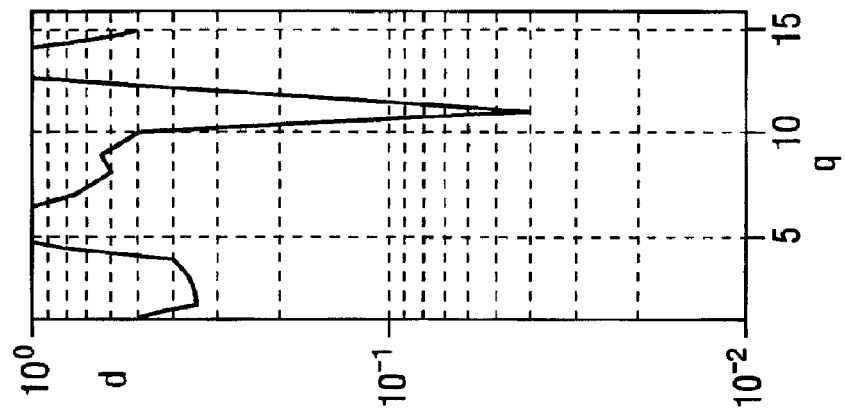
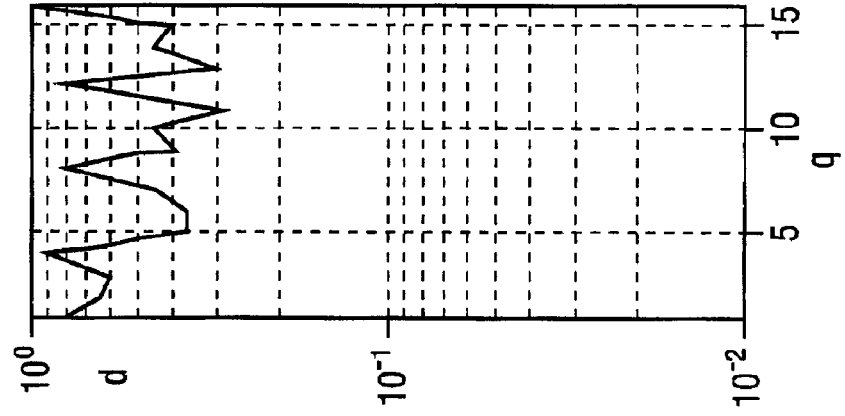
FIG. 5a
FIG. 5b
FIG. 5c

A=2

METHOD AND APPARATUS FOR COLLISION RESOLUTION IN A DELAY-CRITICAL RADIO TELECOMMUNICATIONS SYSTEM

CROSS-REFERENCE TO RELATED APPLICATION

This application claims priority of European Patent Application No. 00301204.4, which was filed on Feb. 16, 2000.

BACKGROUND OF THE INVENTION

1. Field of the Invention

This invention relates to collision resolution in a delay-critical radio telecommunications system, especially to resolution of collision in the Random Access Channel (RACH) in the General Packet Radio Service (GPRS) and Enhanced Data rate for GSM Evolution (EDGE).

2. Description of the Related Art

Cellular mobile communication systems such as the Global System for Mobile communications (GSM) make use of RACHs in order to enable the initial access of the mobile stations to the network. Packet radio networks (like GPRS and EDGE) also make use of similar channels called Packet Random Access Channels (PRACH) not only for the initial access but also during the call since channels are allocated to users on a demand basis, rather than permanently (as in circuit switched GSM). The random access mechanism used in these systems is based on Slotted ALOHA, as described in L. G. Roberts, "ALOHA packet system, with and without slots and capture", ACM Computer Communication Review, vol. 5, no. 2, pp. 28–42, Apr. 1975. The mobile station (MS) transmits a short message over the (P)RACH which occupies one single radio burst. Normally, the position (frequency and timeslot) of the PRACH is indicated by the Broadcast Channel (BCCH). The main problem with ALOHA techniques comes from the fact that the transmission on the PRACH is not centrally coordinated and therefore, several MSs might access the PRACH at the same time. This is referred to as collision. Collisions may have a significant impact on the overall system performance especially for real time services. As an example, the transmission of packet voice over a packet switched radio interface is considered. Since voice is an alternating sequence of active and inactive periods (talkspurts and silence gaps respectively) a channel (combination of frequency and timeslot) is normally allocated to an MS only when it needs to transmit a talkspurt. After the end of the talkspurt transmission, the channel is given to another MS. At the beginning of the talkspurt, an MS needs to access the PRACH in order to indicate its activity and to request a channel. If the base station successfully receives the access message and if a channel is currently available, it sends an acknowledgement message to the MS indicating that a channel has been allocated for its use. In a circuit switched scenario, this process only takes place at the beginning of a call while in a packet switched voice system it happens on the average every 2 sec. However, the whole access procedure is subject to several error mechanisms:

a) Physical layer errors may occur during the uplink transmission of the access message due to co-channel interference and thermal noise;
b) Several MSs access the PRACH simultaneously and therefore, a collision occurs;
c) Physical layer errors may occur during the downlink transmission of the acknowledgement message.

Any of these failure mechanisms contributes to the system performance degradation. If the access phase is not successful, the MS needs to access the PRACH again while speech packets are stored in a temporary buffer. However, in case the buffer overflows, speech packets are dropped. This is known as speech front-end clipping and may significantly deteriorate the quality of oral communication.

It is known that under certain conditions it can be possible for one access packet to be successfully decoded, even if several messages (from different MS) occur simultaneously on the random access channel. This is known as capture effect. Capture can significantly improve the performance of ALOHA-type systems and methods are described by C. Namislo, "Analysis of mobile radio slotted ALOHA systems", IEEE Journal on Selected Areas in Communications, vol. SAC-2, no. 4, pp. 583–588, July 1984 and by H. Zhou, R. H. Deng, "Capture model for mobile radio slotted ALOHA systems", IEE Proc. Communications, vol. 145, no. 2, pp. 91–97, Apr. 1998. Most of the capture models presented in the open literature so far are based on power differences between the packets simultaneously accessing the random access channel (power capture). However, power capture is not an appropriate model for microcellular or picocellular environments where most of the MS are close to the base station and furthermore, (signal-based) power control techniques which aim at equalizing the power from different MS over the cell area are employed.

SUMMARY OF THE INVENTION

It is an object of the invention to provide a method of collision resolution using the technique of capture, and apparatus for carrying out the method.

According to the invention, a collision recovery signal processing unit for use with a multiple-access telecommunications channel characterized by antenna means having a plurality of branches; a plurality of spatio-temporal filter means each arranged to estimate a signal received by the antenna means by application of a different sequence of training-like symbols and to supply a corresponding candidate signal; and signal selector means arranged to select from the candidate signals one or more signals in accordance with a predetermined criterion.

Also according to the invention a radio telecommunication system comprising a plurality of delay-critical users; encoder means to encode signals from said users into a plurality of time slots; first transmitter/receiver means; second transmitter/receiver means; decoder means; and a data or speech sink; characterized in that connected to the second transmitter receiver means there is a signal processing unit according to the present invention.

Yet further according to the invention, in a delay-critical telecommunication system having a multiple access channel in which collisions may occur, a method of collision resolution characterized by the steps of receiving signals from the multiple access channel by an antenna having a plurality of branches; estimating received signals by application of a plurality of different sequences of training-like signals to provide a plurality of candidate signals; and selecting one or more candidate signals in accordance with a predetermined criteria.

BRIEF DESCRIPTION OF THE DRAWINGS

In the drawings, the prior art is described with reference to FIGS. 1 and 2 in which.

Figure 3:
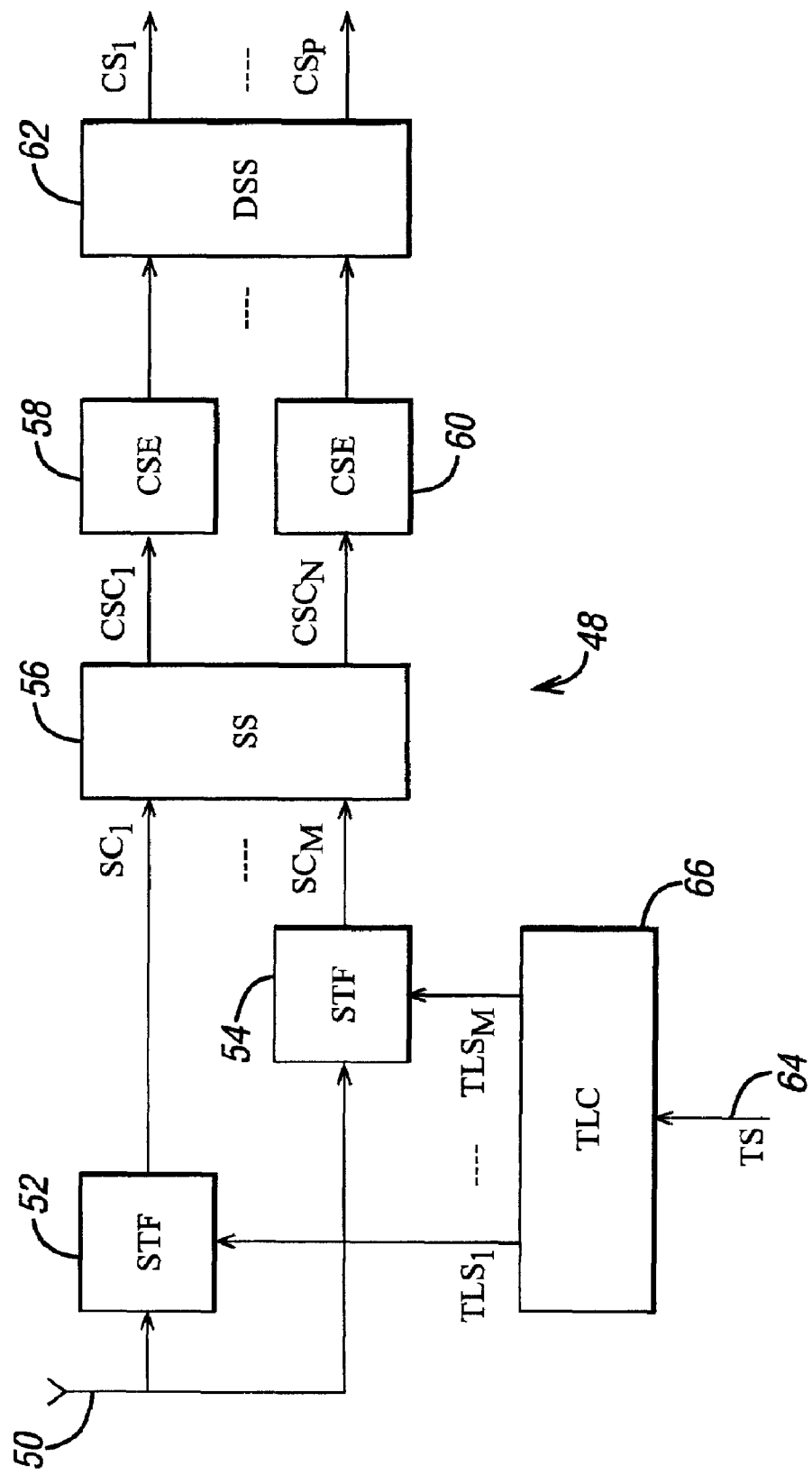
Figures 4, 8:
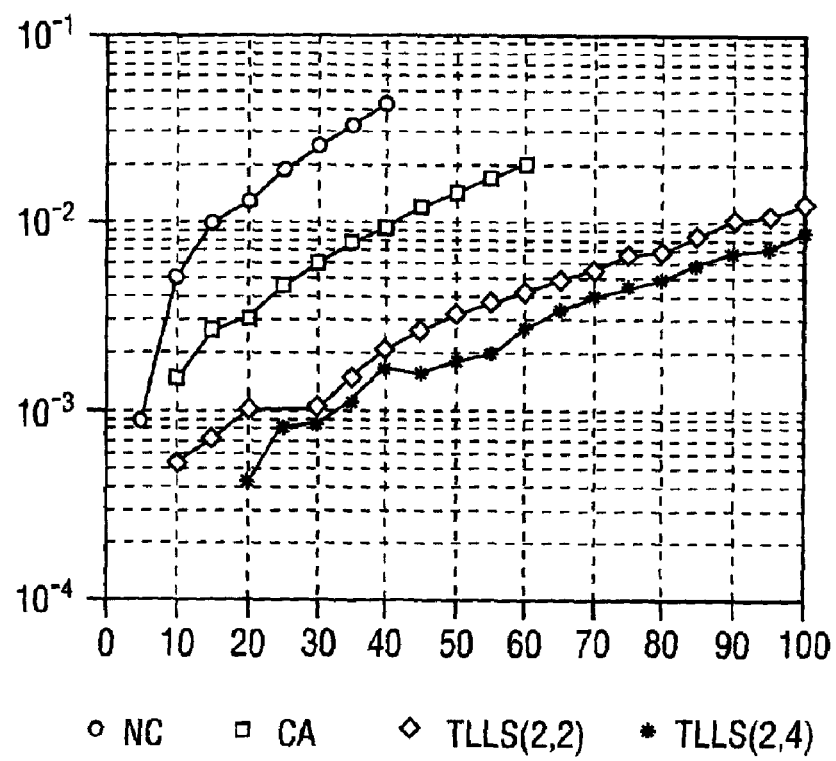
Figure 6:
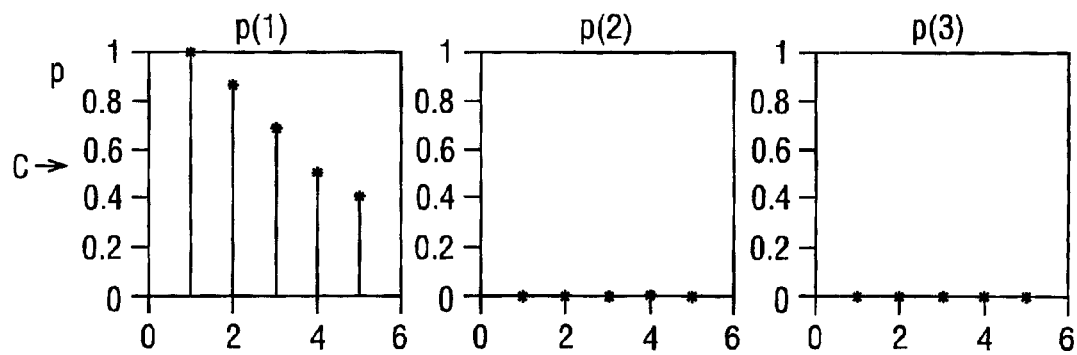
Figure 6:
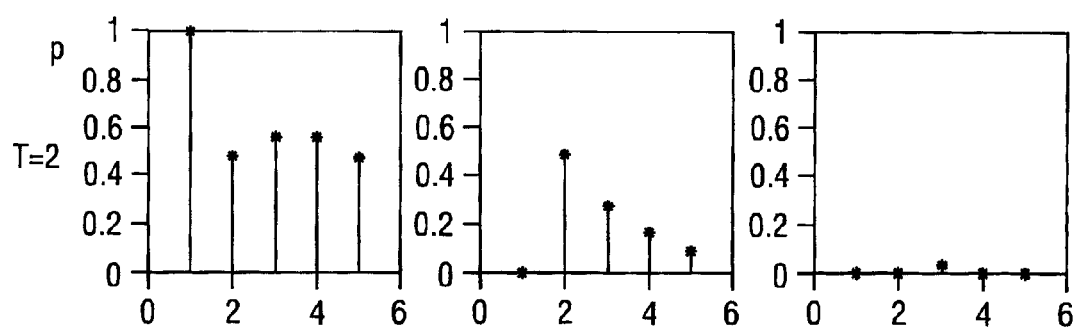
Figure 6:
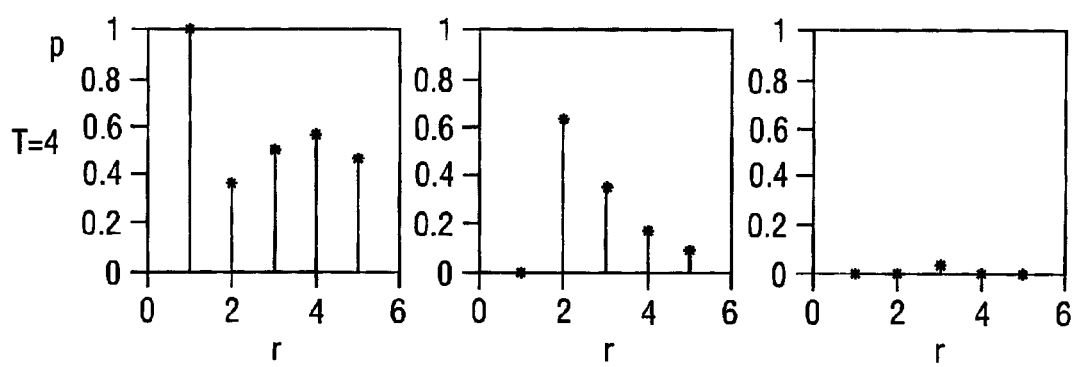
Figure 7:
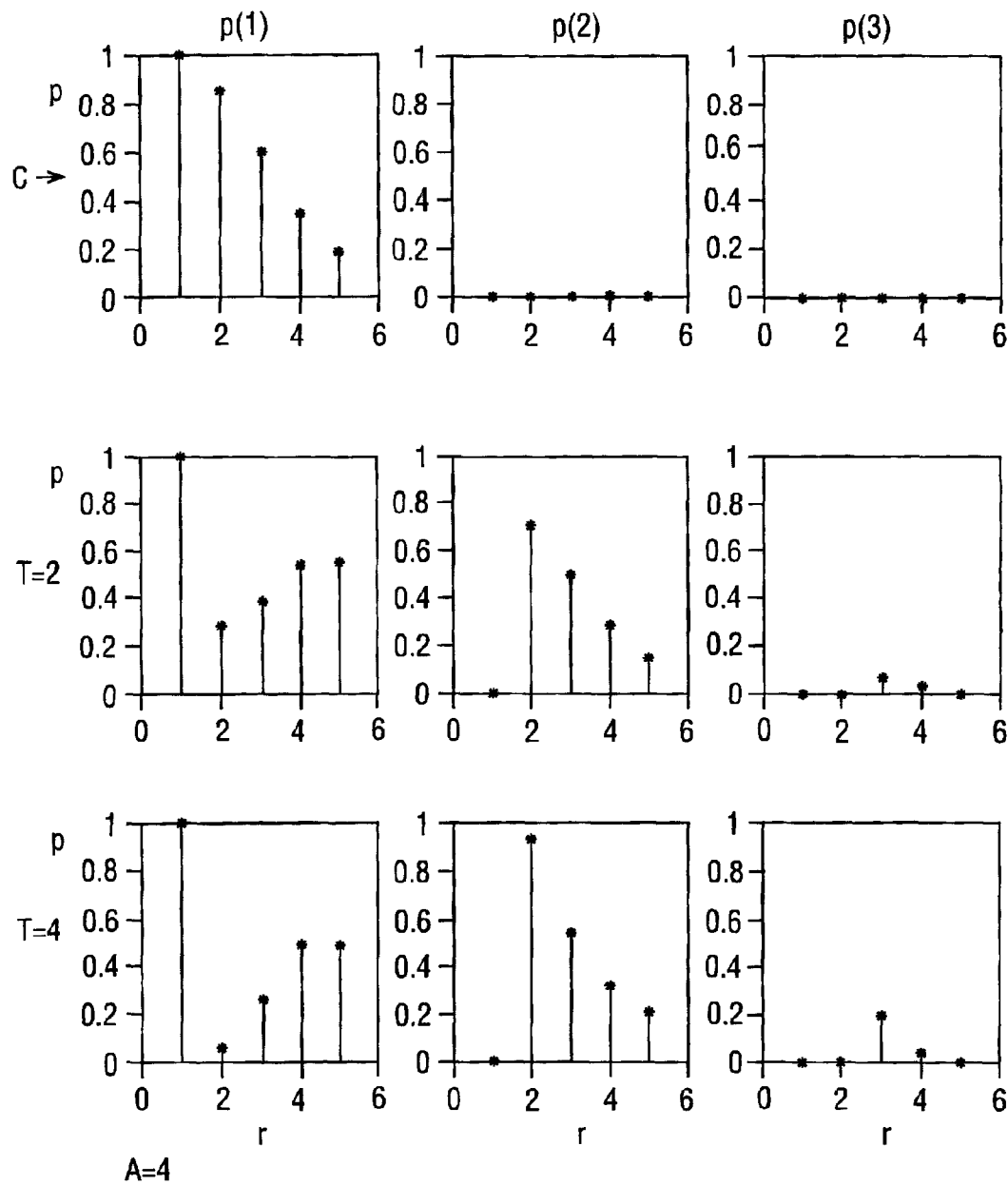

The invention will be described by way of example only with reference to FIGS. 3 to 9 in which:

FIG. 3 illustrates a signal processing unit;

FIG. 4 illustrates the output of a training-like sequence combiner where h=2 and T=2;

FIG. 5 illustrates three examples of a selection statistic calculated at the signal selector of FIG. 3 where T=4;

FIG. 6 illustrates simulation results for a two-branch antenna in FIG. 3;

FIG. 7 illustrates simulation results for a four-branch antenna in FIG. 3;

FIG. 8 illustrates PRACH performance simulation results; and

Figure 9:
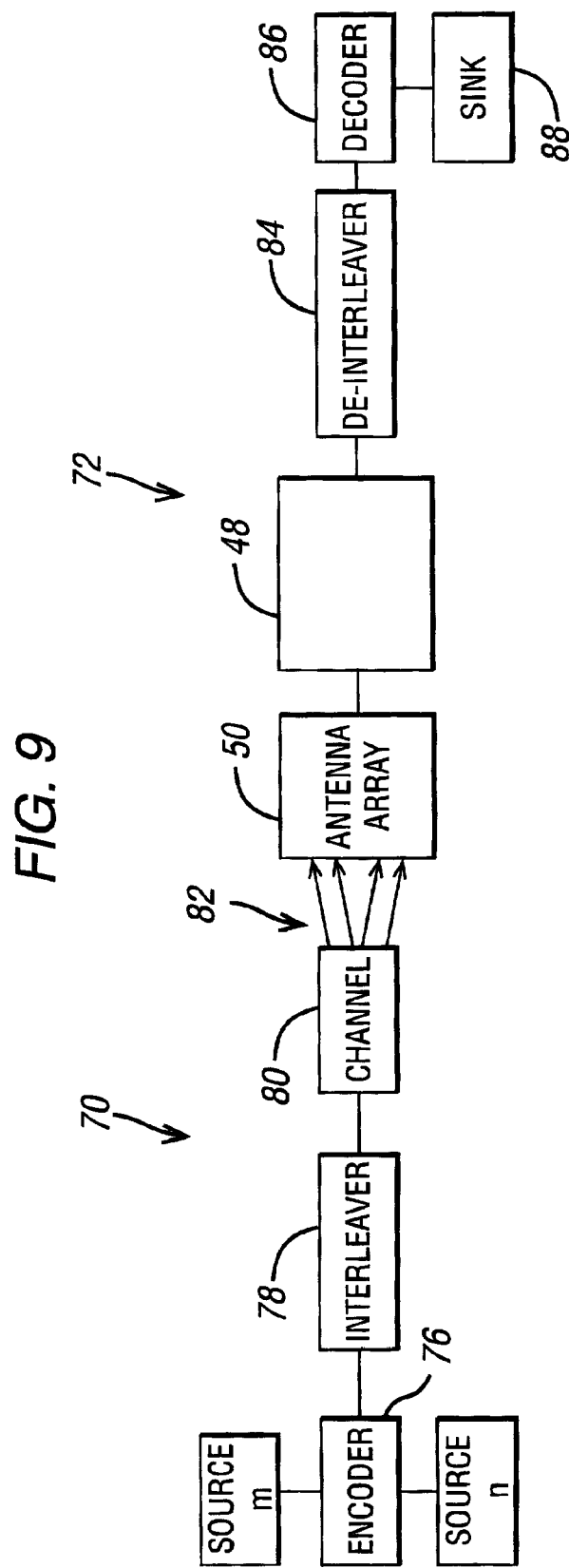

FIG. 9 illustrates schematically a GSM transmitter and receiver.

DETAILED DESCRIPTION

Figure 1:
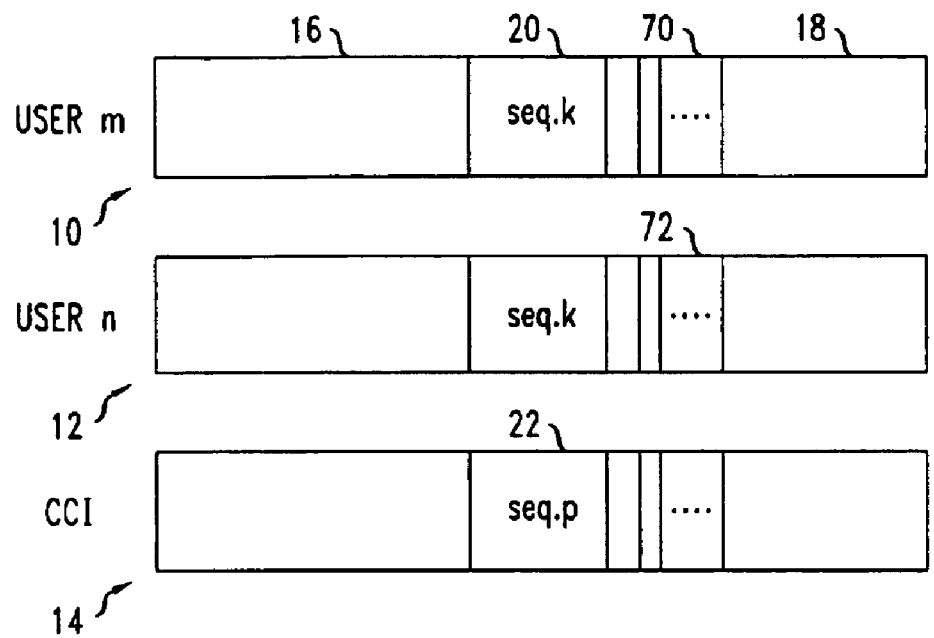
FIG. 1 illustrates a PRACH collision data model.

FIG. 1 illustrates a PRACH collision model. Access burst 10 from user m, access burst 12 from user n, and burst 14 from an adjacent cell representing Co-Channel Interference (CCI) all arrive at a receiving antenna (not shown) simultaneously. The user bursts 10, 12 each have the same structure of two sections of data 16, 18 separated by a training sequence 20. Users m and n are within the same telecommunication cell therefore their training sequences are identical, indicated as seq.k. The CCI burst 14 has the same structure, but since it originates from a different cell, its training sequence 22 contains different training symbols, seq.p.

Figure 2:
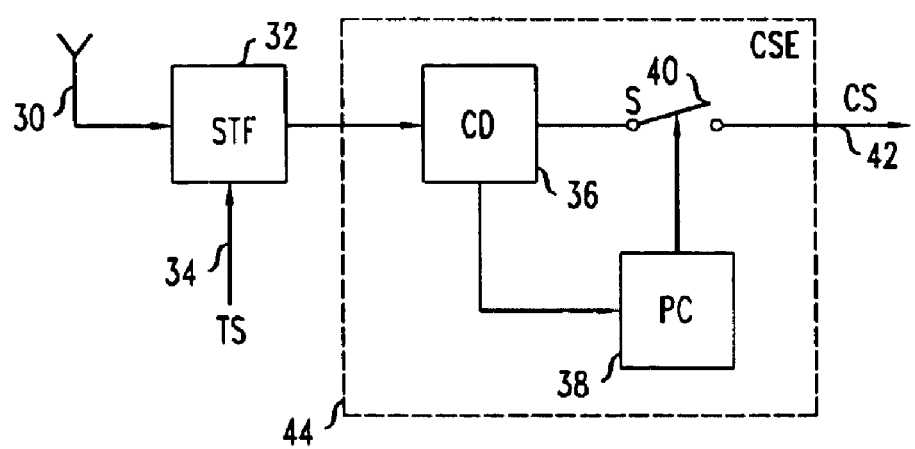
FIG. 2 illustrates a conventional filter structure.

FIG. 2 is a block diagram of conventional equipment used to recover one of the colliding signals. Signals arriving at antenna 30 are supplied to a spatio-temporal filter 32 which also receives and input of required training sequence 34. The spatio-temporal filter 32 estimates the signal by using the training sequence, and passes the estimated signal to a channel decoder block 36. The decoder signal from the decoder 36 passes to a block parity checker 38 and to a switch 40, controlled by the parity checker 38. If the parity checker 38 detects the presence of the required combination of symbols, it closes the switch 40 so that the decoded signal from decoder 36 forms the output, the captured signal 42.

The channel decoder 36, parity checker 38 and switch 40 together form a captured signal estimator 44. Such an estimator can recover only one signal if there is collision at the antenna 30, because all access bursts contain the same training sequence 34.

The spatio-temporal filter 32 can apply any known training-based or semi-blind algorithm.

It is known that, potentially, blind techniques can be applied to recover some or all of simultaneous users and CCI in a collision. In that case the known training sequence can be ignored and some general signal property can be exploited such as the constant modulus property. The drawbacks of this approach are that the total number of signals may be high (simultaneous users, CCI and their multiple paths), and a large volume of data is required to avoid local minima of an optimization function. Usually, the latter is not the case for mobile radio communications systems when only a limited volume of data received in stationary conditions is available.

FIG. 3 illustrates signal processing unit according to the invention which can recover more than one user in a collision. A multiple branch antenna 50 is connected to M spatio-temporal filters, two only 52 54 being shown for clarity. The M filter outputs signal candidates SC1 to SCM, are connected to a signal selector 56, which has N outputs each connected to a captured signal estimator, two only 58, 60 being shown for clarity. The outputs of the N signal estimators are connected to a different signal selector 62.

The training sequence 64 appropriate to the telecommunication cell is supplied to a training-like sequence combiner 66, which provides M different training-like sequencers TLS1 to TLSM which are supplied one to each spatio-temporal filter 52, 54. Each filter runs the same algorithm, which can be any known training-based or semi blind algorithm.

Referring again to FIG. 1, if a part of the data payload is selected for the users m, n, the parts 70, 72 having the same number of symbols, there is a non-zero probability that the information symbols will be different. These selected symbols will be referred to as training-like symbols. Thus different (linearly independent, not orthogonal) training-like sequences can be used to recover the corresponding signals.

The position of the training-like symbols in the payload can either be selected or random; the decision will be made by the manufacturer of the base station in which the apparatus according to the invention is installed.

In FIG. 3, the combiner 66 generates M different training-like sequences TLS1 to TLSM using the training-like symbols in the payload. Each filter 52, 54 estimates a signal from antenna 50 using the symbols supplied to it, providing M outputs of Signal Candidates SC1 to SCM, and the signal selector 56 selects N signal candidates where N≦M, in accordance with some selection criterion.

The selection criterion may be for example, the distance from the Finite Alphabet (FA) or the Mean Square Error (MSE).

The N selected signals pass one to each captured signal estimator 58, 60 which each provide a captured signal output to the different signal selector 62. The selector 62 eliminates the signals which are duplicated and selects P signals where P=0 . . . N.

Suppose the antenna 50 receives a signal comprising training-like symbols from colliding signals in a multiple access channel. Suppose there are T information symbols, and a Finite Alphabet (FA) of h symbols, selected to be training-like symbols; in this example, all possible values of the FA of T information symbols in the payloads of the colliding signals will be used to the existing training sequence as shown in FIG. 4 for T=2 and h=2. In FIG. 3, the number M of spatio-temporal filters is determined by $M=h^T$.

The complexity of the solution is $O(h^T)$.

Estimation of distance from the Finite Alphabet is appropriate as a selection criterion. An alternative criterion, if the volume of training data is sufficiently large, is to use the Mean Square Error.

FIG. 4 illustrates four training-like sequences TLS1 to TLS4, for M=4 (T=2) and h=2 (the binary FA).

Capture simulation was calculated for GMSK (Gaussian Minimum Shift Keying) signals received by two and four branch antenna arrays in a typical GSM urban scenario TU50 with SNR=35 dB (Signal to Noise Ratio) and SIR=6 dB (Signal to Interference Ratio). The simulation assumes a PRACH burst structure corresponding to the GSM normal burst. For each burst, the transmitted bits are obtained by channel encoding of one data block. The channel coding scheme includes a (34, 28) systematic cyclic redundancy check (CRC) code (which accepts 28 bits at the input and provides 6 parity check bits at the output), and a (3, 1, 5)

convolutional code (rate ⅓, constraint length 5 convolutional code). The spatio-temporal filter consists of branch FIR (Finite Impulse Response) filters of five coefficients adjusted by means of the Least Squares algorithm. The parameters of the algorithm are T=2 and 4, (M=4 and 16 respectively).

FIG. 5 shows three examples of the selection statistic calculated at the signal selector 56 for two branch antenna and T=4. The figures of plots of distance d from the FA against number q of the training-like sequence are shown.

In FIG. 5a, there is no reliable capture. In FIG. 5b there are two users, and one is captured, indicated by the marked minimum. In FIG. 5c there are two users and both are captured, indicated by the two marked minima.

FIG. 6 shows simulated plots of probability of capture p against number of colliding users r for a 2-branch antenna. The top row illustrates the conventional solution, the middle row illustrates the inventive solution for T=2 and the bottom row illustrates the inventive solution for T=4.

The first column relates to the probability of capture for one user p(1). All three solutions can capture a signal without difficulty when there is only one user, but when there are more users, the probability of capture decreases in all solutions.

The second column relates to the probability of capturing two users p(2). The conventional solution cannot capture a second user. In the inventive solution, when T=2, the probability of capturing two users is 0.5, and when T=4, the probability is 0.6. The third column relates to the probability of capturing three users p(3). The conventional solution cannot capture a third user. In the inventive solution, there is a low probability of capture for this 2 branch antenna arrangement.

FIG. 7 shows plots similar to those in FIG. 6 but this time for a 4 branch antenna. The conventional solution results are unchanged. In the inventive solutions, for T=2, the probability of capturing two users is now 0.7, and of capturing three users is less than 0.1. However for T=4, the probability of capturing two users is now greater than 0.9, and the probability of capturing three users is about 0.2.

Consider now the application of the inventive technique in a packet voice system.

Consider a TDMA (Time Division Multiple Access) based system (with GSM-like channel structure). One of the available channels (timeslot) is used for the accommodation of the PRACH. Several users share the same channels by means of packet switching and therefore, the PRACH is being used every time a voice user needs to indicate to the base station that it is in need of a channel. It is assumed that the duration of speech talkspurts and silence periods is exponentially distributed with average values of 1 sec and 1.35 sec respectively. The granularity of the PRACH is 5 msec. Once a MS generates a talkspurt it randomly accesses a PRACH timeslot with a certain probability. Although there are several policies on how the access probability is controlled, in this study a simple technique is considered in which each PRACH slot is accessed with a constant probability equal to ⅜. Within 20 msec there are 4 PRACH slots and the MS can access any of them with a probability of ⅜. When at least one of the access attempts is successful, the MS is notified in the next 20 msec period by the base station. In this case a downlink message is sent which contains information about the outcome of the uplink access. When there are channels available for allocation, the MS is notified on which channel to go and start transmission of speech packets. When there are no traffic channels available, the base station sends a queuing notification message to the MS, informing it that its uplink attempt was successful, so that the MS need not access the PRACH again.

As explained above, in the case of real time services the access phase needs to be completed very quickly because delays in uplink access are directly translated in service performance degradation. As a performance index the probability that an access attempt fails to be completed within 60 msec is chosen. The performances of a) a system without any capture capabilities,
b) a system implementing a conventional algorithm and
c) a system that makes use of the proposed technique are compared.

For both uplink and downlink it is assumed that the required signaling corresponds to 28 data bits, which are mapped by means of channel coding onto one transmitted burst. As an example of coding scheme a (34, 28) systematic cyclic redundancy check (CRC) block code is considered which produces 6 parity check from each 28-bits block. The resulting 34 bits plus 4 additional tail bits are then protected by a rate ⅓, constraint length 5 convolutional code. The 2×57=114 coded data bits are finally transmitted in one burst including 2×4 tail bits and a 26-bits training sequence.

For convenience a "capture matrix" is introduced which describes the capture properties of the channel. Up to 3 messages can be successfully recovered. It is also assumed that if more than 5 simultaneous transmissions occur in the same PRACH burst, all messages are corrupted. The elements of the capture matrix $P=[p(m,n)]_{3\times5}$, are defined as follows:

$$p(m,n)=\Pr\{m \text{ successful messages}|n \text{ simultaneous accesses}\}$$

For the case of no capture it is assumed that whenever more than one MS accesses the same PRACH slot simultaneously, all access messages are corrupted. In addition, all uplink transmissions are subject to a block error rate of 1% and all downlink transmissions to a block error rate of 0.4%. In this case the capture matrix is given by:

$$P = \begin{bmatrix} 0.9 & 0 & 0 & 0 & 0 \\ 0 & 0 & 0 & 0 & 0 \\ 0 & 0 & 0 & 0 & 0 \end{bmatrix}$$

The second case is when a conventional algorithm is considered. The downlink block error rate is 0.4%. The capture matrix in this case (determined after simulating the capture mechanism, for SRN=35 dB and SIR=6 dB and 2 receiver antennas) according to the plots in the first row of FIG. 6 becomes:

$$P = \begin{bmatrix} 1 & 0.85 & 0.678 & 0.506 & 0.408 \\ 0 & 0 & 0 & 0 & 0 \\ 0 & 0 & 0 & 0 & 0 \end{bmatrix}$$

As seen from the capture matrix, although it is possible to recover one message, multiple capture is not possible.

Finally, the inventive algorithm is considered. Two cases were examined, both of them responding to the use of 2 antennas. In the first case where two training like symbols are used, the capture matrix according to the plots in the second row of FIG. 6 becomes:

$$P = \begin{bmatrix} 1 & 0.46 & 0.558 & 0.568 & 0.466 \\ 0 & 0.518 & 0.308 & 0.156 & 0.084 \\ 0 & 0 & 0.026 & 0.002 & 0.002 \end{bmatrix}$$

In the case where 4 training like symbols are used, according to the plots in the third row of FIG. 6 the capture matrix is:

$$P = \begin{bmatrix} 0 & 0.322 & 0.516 & 0.536 & 0.474 \\ 0 & 0.666 & 0.332 & 0.156 & 0.092 \\ 0 & 0 & 0.036 & 0.018 & 0.004 \end{bmatrix}$$

The results of the system simulations are illustrated in FIG. 8 where the probability of an access failure within 60 msec is plotted as a function of the number of the simultaneous users (calls) in the system. The four plots show no capture (NC); conventional algorithm (CA); and plots according to the invention for Training-Like Least Squares(TLLS) for a two branch antenna and T=2 or T=4 (TLLS(2, 2) and TLLS (2, 4). These results clearly demonstrate the superior performance achieved when the inventive algorithm is being used.

As a summary of these results the following table gives the maximum number of calls that can be supported by the same PRACH, if the access failure probability is not to exceed a value of 0.01.

| Capture Technique | Max. Number of Simultaneous Calls |
| --- | --- |
| No capture | 15 |
| Capture with conventional algorithm (LS) with 2 antennas | 40 |
| Inventive technique with 2 antennas and 2 training like symbols TLLS (2,2) | 90 |
| Inventive technique with 2 antennas and 4 training like symbols TLLS (2,4) | 100 |

Finally it should be noted that the use of four antennas instead of two would provide even better performance as indicated by the capture probabilities illustrated in FIG. 7.

In Figure there is a GSM transmitter 70 and receiver 72. The conventional transmitter comprises two speech or time-critical data sources m, n, an encoder 76, an interleaver 78 and a channel selector 80 which sends out signals on a number of channels 82. In the receiver 72, a signal received by antenna array 50 passes through a collision recovery signal processing unit 48 according to the invention to a de-interleaver 84, a decoder 86 and a sink 88.

While the invention has been described with reference to a PRACH and voice users, it is also applicable to other multi-access channels in which collisions may occur and to data which is time-critical, for example real time video. The invention gives a probability of collision recovery for two or more users, in contrast to present arrangements in which collision recovery in a multi-access channel is not possible.

What is claimed is:

1. A collision recovery signal processing unit for use with a multiple-access telecommunications channel comprising antenna means having a plurality of branches; a plurality of spatio-temporal filter means each arranged to estimate a signal received by the antenna means by application of a different sequence of training-like symbols and to supply a corresponding candidate signal; and signal selector means arranged to select from the candidate signals one or more signals in accordance with a predetermined criterion, in which the pre-determined criterion is the distance of a candidate signal from the finite alphabet.

2. A signal processing unit according to claim 1 in which training symbols are processed in addition to said training-like symbols.

3. A signal processing unit according to claim 1 in which the filter means each operate on a number of information signals T received from the antenna means, in which the finite alphabet has h symbols, and the number M of filter means is given by $M=h^T$.

4. A signal processing unit according to claim 1 further comprising a plurality of captured signal estimators arranged to receive the selected signals and having outputs connected to a different signal selector operative to eliminate signals which are duplicated.

5. A signal processing unit according to claim 1 in which each spatio-temporal filter means runs the same training-based or semiblind algorithm.

6. A radio telecommunications system comprising a plurality of time critical users mn; encoder means to encode signals from said users into a plurality of timeslots; first transmitter/receiver means; second transmitter/receiver means; decoder means; and a data or speech sink; wherein connected to the second transmitter/receiver means there is signal processing unit comprising antenna means having a plurality of branches; a plurality of spatio-temporal filter means each arranged to estimate a signal received by the antenna means by application of a different sequence of training-like symbols and to supply a corresponding candidate signal; and signal selector means arranged to select from the candidate signals one or more signals in accordance with a predetermined criterion, in which the pre-determined criterion is the distance of a candidate signal from the finite alphabet.

7. In a time critical telecommunications system having a multiple access channel in which collisions may occur, a method of collision resolution comprising the steps of receiving signals from the multiple access channel by an antenna having a plurality of branches; estimating received signals by application of a plurality of different sequences of training-like symbols to provide a plurality of candidate signals; and selecting one or more candidate signals in accordance with a predetermined criterion, in which the pre-determined criterion is the distance of a candidate signal from the finite alphabet.

8. A collision recovery signal processing unit for use with a multiple-access telecommunications channel comprising antenna means having a plurality of branches; a plurality of spatio-temporal filter means each arranged to estimate a signal received by the antenna means by application of a different sequence of training-like symbols and to supply a corresponding candidate signal; and signal selector means arranged to select from the candidate signals one or more signals in accordance with a predetermined criterion, in which the predetermined criterion is the mean square error of the candidate signals.

9. A collision recovery signal processing unit for use with a multiple-access telecommunications channel comprising antenna means having a plurality of branches; a plurality of spatio-temporal filter means each arranged to estimate a signal received by the antenna means by application of a different sequence of training-like symbols and to supply a corresponding candidate signal; and signal selector means arranged to select from the candidate signals one or more signals in accordance with a predetermined criterion, further comprising a plurality of captured signal estimators arranged to receive the selected signals and having outputs connected to a different signal selector operative to eliminate signals which are duplicated.

* * * * *